United States Patent
Ahmed et al.

(10) Patent No.: US 9,864,531 B2
(45) Date of Patent: Jan. 9, 2018

(54) RAID-TOPOLOGY-AWARE MULTIPATH ROUTING

(71) Applicant: International Business Machines Corporation, Armonk, NY (US)

(72) Inventors: Faisal Ahmed, Round Rock, TX (US); Brian C. Twichell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 14/710,647

(22) Filed: May 13, 2015

(65) Prior Publication Data
US 2016/0335003 A1    Nov. 17, 2016

(51) Int. Cl.
G06F 3/06       (2006.01)
G06F 11/10     (2006.01)
G06F 11/20     (2006.01)

(52) U.S. Cl.
CPC .......... G06F 3/0619 (2013.01); G06F 3/0635 (2013.01); G06F 3/0665 (2013.01); G06F 3/0689 (2013.01); G06F 11/10 (2013.01); G06F 11/20 (2013.01)

(58) Field of Classification Search
CPC .................................. G06F 11/10; G06F 11/20
See application file for complete search history.

(56) References Cited

U.S. PATENT DOCUMENTS

| | | | | |
|---|---|---|---|---|
| 5,895,483 A * | 4/1999 | Mori | ...................... | G06F 3/0601 711/114 |
| 7,911,962 B2 | 3/2011 | Khuu et al. | | |
| 2005/0066124 A1 * | 3/2005 | Horn | ................... | G06F 11/1076 711/114 |
| 2009/0259882 A1 * | 10/2009 | Shellhamer | ......... | G06F 11/1076 714/6.32 |
| 2012/0278552 A1 | 11/2012 | Singh et al. | | |
| 2013/0282980 A1 * | 10/2013 | Bennett | ................. | G06F 3/0689 711/114 |
| 2013/0311719 A1 * | 11/2013 | Doedline, Jr. | ........ | G06F 3/0613 711/114 |
| 2014/0359094 A1 | 12/2014 | Wittenschlaeger | | |
| 2015/0143169 A1 * | 5/2015 | Konta | ................. | G06F 11/1092 714/6.32 |
| 2015/0331765 A1 * | 11/2015 | Madhusudana | ..... | G06F 11/2058 714/5.11 |

FOREIGN PATENT DOCUMENTS

| | | |
|---|---|---|
| CN | 103685054 A | 3/2014 |
| WO | 2014052878 A1 | 4/2014 |

OTHER PUBLICATIONS

Domke et al., "Fail-in-Place Network Design: Interaction between Topology, Routing Algorithm and Failures", SC14: International Conference for High Performance Computing, Networking, Storage and Analysis, 978-1-4799-5500-8/14, © 2014 IEEE, DOI 10.1109/SC.2014.54, pp. 597-608.

(Continued)

*Primary Examiner* — Charles Rones
*Assistant Examiner* — Tian-Pong Chang
(74) *Attorney, Agent, or Firm* — David B. Woycechowsky

(57) ABSTRACT

Determining a preferred interface for write access to a data storage system having multiple interfaces. Interface preference is determined at the data-stripe level. Write requests are routed to the preferred interface.

18 Claims, 4 Drawing Sheets

(56) References Cited

OTHER PUBLICATIONS

Tang et al., "Improving Multipath Reliability in Topology-Aware Overlay Networks", Proceedings of the 25th IEEE International Conference on Distributed Computing Systems Workshops (ICDCSW'05), 1545-0678/05, © 2005 IEEE.

Yang et al., "RAID the WSN: Packet-based Reliable Cooperative Diversity", IEEE ICC 2012—Ad-hoc and Sensor Networking Symposium, 978-1-4577-2053-6/12, © 2012 IEEE, pp. 371-375.

"DM Multipath", Red Hat Enterprise Linux 6, DM Multipath Configuration and Administration, Edition 1, Copyright © 2014 Red Hat, Inc. and others, <https://access.redhat.com/documentation/en-US/Red_Hat_Enterprise_Linux/6/html-single/DM_Multipath/>.

"Multipath I/O", Wikipedia, the free encyclopedia, page last modified on Apr. 30, 2015, at 09:30, 4 pages, <http://en.wikipedia.org/wiki/Multipath_I/O>.

"RAID", Wikipedia, the free encyclopedia, page last modified on May 5, 2015, at 06:57, 13 pages, <http://en.wikipedia.org/wiki/RAID>.

\* cited by examiner

RAID-TOPOLOGY-AWARE MULTIPATH ROUTING

BACKGROUND

The present invention relates generally to the field of storage virtualization, and more particularly to multipath routing in virtualized storage systems.

The Wikipedia entry for "Multipath I/O" (http://en.wikipedia.org/wiki/Multipath_I/O, as of Mar. 26, 2015) states as follows: "[M]ultipath I/O [MPIO] is a fault-tolerance and performance-enhancement technique that defines more than one physical path between the CPU in a computer system and its mass-storage devices. . . . Multipath software layers can leverage the redundant paths to provide performance-enhancing features, including dynamic load balancing, traffic shaping, automatic path management, and dynamic reconfiguration." MPIO can be used, for example, with direct-attached storage (DAS), network-attached storage (NAS), and storage area network (SAN) storage architectures.

Multipath routing algorithms choose the path on which to send an I/O request from among the multiple paths between a host and a storage subsystem. A path consists of a specific interface on the host and a specific interface on the storage subsystem, along with zero or more intermediate 'hops' which are introduced by, for example, SAN switches. Components along the path may be real or virtual. Current supported routing algorithms include round-robin (alternate sequentially among paths), queue-length (choose the path with the least number of uncompleted I/O requests), service-time (choose the path which has the shortest estimated service time), and others.

The Wikipedia entry for "RAID" (http://en.wikipedia.org/wiki/RAID, as of Mar. 26, 2015) states as follows: "RAID (originally redundant array of inexpensive disks; now commonly redundant array of independent disks) is a data storage virtualization technology that combines multiple disk drive components into a logical unit for the purposes of data redundancy or performance improvement."

Known RAID configurations include the standard levels RAID 0 through RAID 6, nested levels, and many non-standard levels. Storage subsystems often support RAID. RAID is typically used in these contexts to increase the availability or performance of storage by distributing and duplicating data over a collection of storage devices, which may be, for example, disks or flash modules. RAID 5 is a particular form of RAID in which a logically contiguous fixed-size set of blocks (the "data blocks") are distributed evenly over a set of devices and augmented by a parity block which is stored on a separate device. The logically contiguous set of blocks is known as a "stripe". The contents of the parity block are calculated from the contents of the data blocks in such a way that the original data can be reconstructed in the event of the corruption of any single data block. Each of the data and parity blocks are stored on different devices, so that the original data can be reconstructed in case of a single device failure.

SUMMARY

According to an aspect of the present invention, there is a method, computer program product and/or system that performs the following actions (not necessarily in the following order): (i) receives a set of input data; (ii) determines, based on the set of input data, a set of stripe-interface preferences respectively between: (a) stripes of a plurality of data stripes of a data storage system, and (b) storage system interfaces of a plurality of storage system interfaces, with the preferences including a first preference between a first data stripe and a first storage system interface; and (iii) routes a first request for storing a first piece of data to the first data stripe of the data storage system to the first storage system interface based on the first preference.

DETAILED DESCRIPTION

Figure 1:
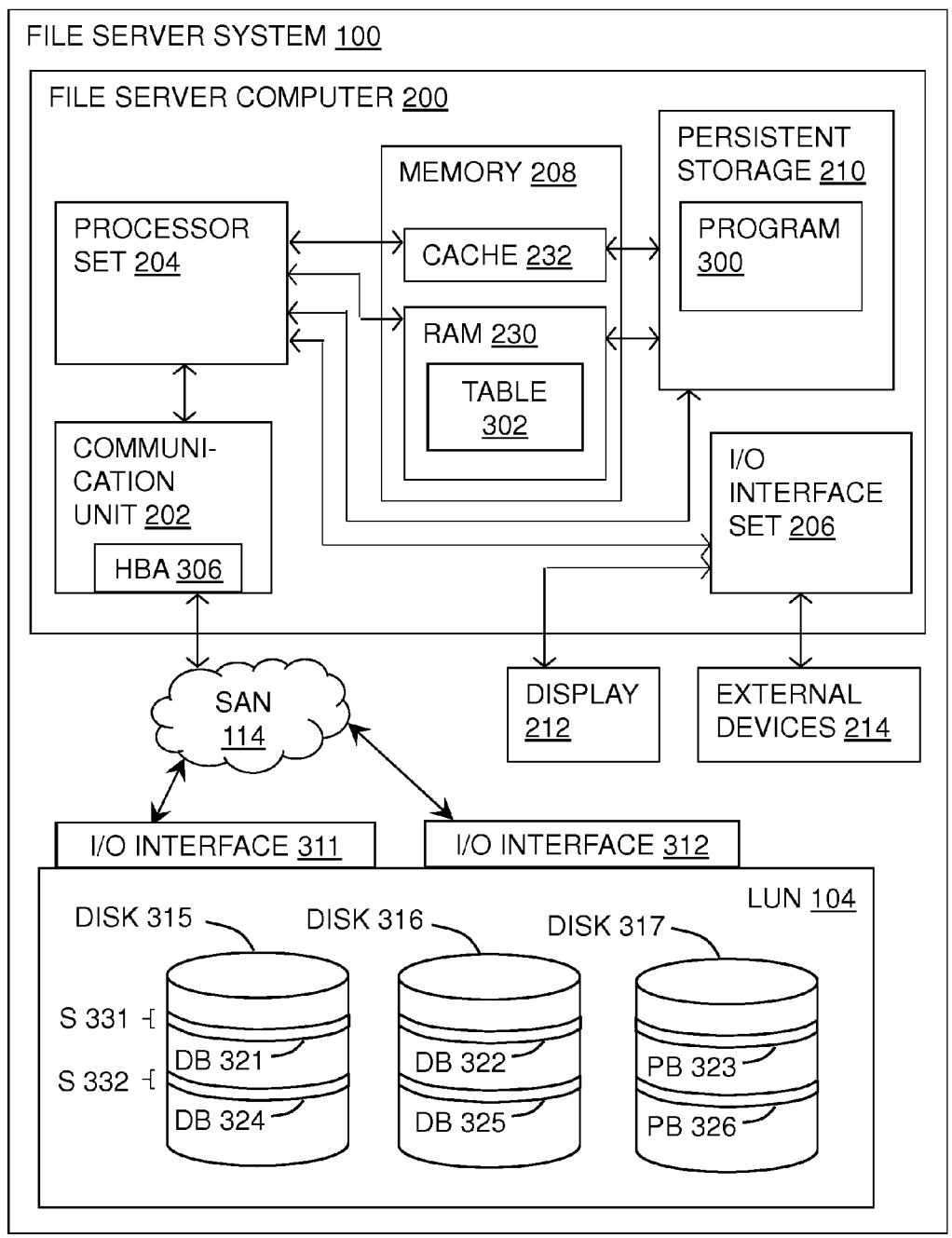
FIG. 1 is a block diagram of a first embodiment of a system according to the present invention.

Some embodiments of the present invention include a multipath routing algorithm designed to reduce the performance degradation caused by the transfer of RAID parity blocks between private I/O interface cache buffers on storage subsystems that have multiple I/O interfaces. According to some embodiments of the multipath routing algorithm, a piece of data to be written to a storage system is sent to an I/O interface (also sometimes herein referred to as a "storage system interface") that already has the parity block buffered. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a set of operational actions to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of file server system 100, including: file server computer 200; communication unit 202; processor set 204; input/output (I/O) interface set 206 containing host bus adapter (HBA) 306; storage area network (SAN) 114; logical unit (logical unit number, or LUN) 104, which is a RAID array with disks 315, 316, and 317, and is connected to SAN 114 via I/O interfaces 311 and 312; memory device 208; persistent storage device 210; display device 212; external device set 214; random access memory (RAM) devices 230; cache memory device 232; table 302; and program 300. Disks 315 and 316 contain data blocks 321, 322, 324, and 325, while disk 317 contains parity blocks 323 and 326. Stripe 331 is composed of data blocks 321 and 322 and their associated parity block 323, while stripe 332 is composed of data blocks data blocks 324 and 325 and their associated parity block 326. Both stripes 331 and 332 can be written to via either of I/O interfaces 311 or 312.

File server computer 200 is, in many respects, representative of the various computer sub-system(s) in the present invention. Accordingly, several portions of computer 200 will now be discussed in the following paragraphs.

Computer 200 may be a laptop computer, tablet computer, netbook computer, personal computer (PC), a desktop computer, a personal digital assistant (PDA), a smart phone, or any programmable electronic device capable of communicating with LUN 104 via SAN 114. Program 300 is a collection of machine readable instructions and/or data that is used to create, manage and control certain software functions that will be discussed in detail, below, in the Example Embodiment sub-section of this Detailed Description section.

Computer 200 is capable of communicating with other storage sub-systems via SAN 114. SAN 114 can be, for example, a local area network (LAN), a wide area network (WAN) such as the Internet, or a combination of the two, and can include wired, wireless, or fiber optic connections. In general, network 114 can be any combination of connections and protocols that will support communications between server and storage sub-systems.

Computer 200 is shown as a block diagram with many double arrows. These double arrows (no separate reference numerals) represent a communications fabric, which provides communications between various components of computer 200. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for computer 200; and/or (ii) devices external to computer 200 may be able to provide memory for computer 200.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to computer 200. In these examples, communications unit 202 includes one or more network interface cards, including HBA 306. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
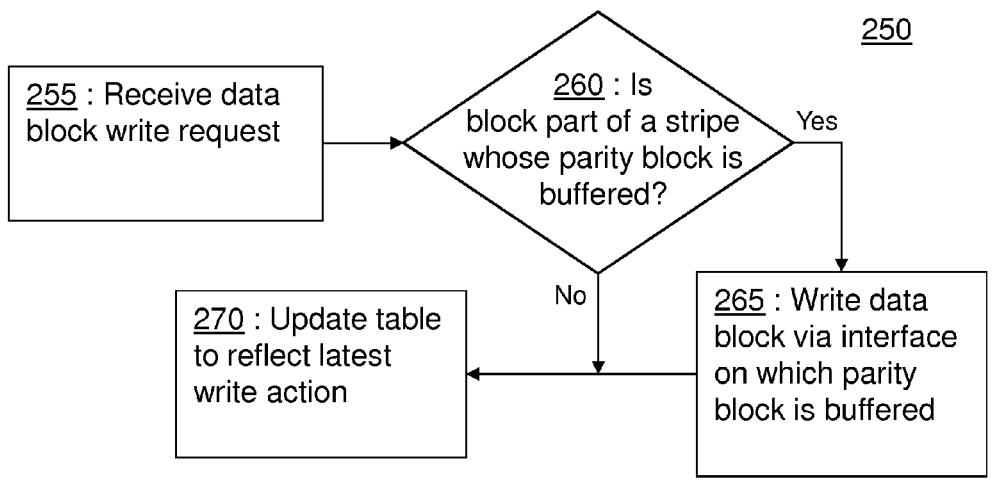
FIG. 2 is a flowchart showing a first embodiment method performed, at least in part, by the first embodiment system.
Figure 3:
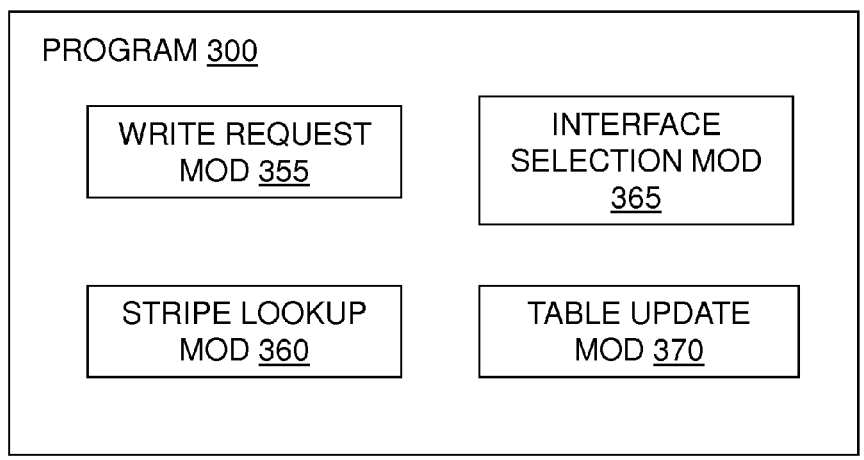
FIG. 3 is a block diagram showing a machine logic (for example, software) portion of the first embodiment system.

FIG. 2 shows flowchart 250 depicting a method according to the present invention. FIG. 3 shows program 300 for performing at least some of the method actions of flowchart 250. This method and associated software will now be discussed, over the course of the following paragraphs, with extensive reference to FIG. 2 (for the method action blocks) and FIG. 3 (for the software blocks).

At action 255, write request module ("mod") 355 accepts a request from file server computer 200 (see FIG. 1) to write a block of data to LUN/RAID array 104. In this example, the block to be written is data block 322. As file server computer 200 is connected to RAID array 104 via two storage-side interfaces (I/O interfaces 311 and 312), program 300 must decide to which interface it will forward the write request. Note that while the device components of file server system 100 are real components in this embodiment, they could alternatively be virtual components, such as is commonly found in cloud environments; there could be multiple interfaces on the host side as well as on the storage side; and the LUN and host could be linked by mechanisms other than a SAN, such as in the case of direct-attached storage (DAS).

At action 260, stripe lookup mod 360 determines to which RAID stripe data block 322 belongs and which of I/O interfaces 311 and 312, if either, has the parity block for that stripe buffered. Stripe lookup mod 360 makes this determination by consulting table 302, which tracks the stripes most recently written by I/O interface (and thus the stripes whose parity blocks are buffered by that interface). Table 302 currently contains only 1 entry—the ordered pair (331, 311)—which specifies that stripe 331 was recently written to via I/O interface 311. After determining that block 322 belongs to stripe 331 (for example, by knowing the starting address of block 322 and the starting address and length of stripe 331), stripe lookup mod 360 consults table 302 to determine that this stripe was recently written by I/O interface 311.

Note that, in general: (i) any number of interfaces could be supported on the storage side; (ii) multiple LUNs could be supported by also tracking LUN in table 302; (iii) multiple HBAs or host-side storage clients sharing the same LUN could be supported, as long as table 302 remains in sync across these clients (for example by maintaining table 302 in a section of shared memory on a computer hosting all the clients); (iv) parity blocks or other data integrity information need not all be stored on the same device but could instead be distributed among the devices (for example, the locations of data block 325 and parity block 326—but not those of data block 322 and parity block 323—might be swapped in some embodiments); and/or (v) a stripe may have multiple parity blocks, as in RAID 6. Note also that I/O interfaces 311 and 312 need not be part of LUN 104 but could be, for example, interfaces on the host side, if there is a direct correspondence between those interfaces and the private buffering of RAID parity blocks.

Although the purpose of determining the stripe here is to determine where, if at all, the associated parity block is buffered, determining the stripe could also be of value where, say, no parity is involved, but attempts to write to the same stripe by different interfaces simultaneously or in rapid succession causes some degree of contention. In such a situation, determining stripe 331 was recently written to via I/O interface 311 (or that I/O interface 311 has a data block of stipe 331 buffered, or some other measure or proxy of the degree of contention or contention relief) would allow subsequent writes to that same stripe to be routed to the same interface, thereby reducing contention and improving performance.

At action 265, interface selection mod 365 selects an interface to which to send the write request. Interface selection mod 365 chooses to send the request to I/O interface 311 because this interface was previously determined by stripe lookup mod 360 to have parity block 323 already buffered (see above). This is an example of a stipe-interface preference. Had stripe lookup mod 360 not found an interface with parity block 323 already buffered, interface selection mod 365 would have selected an interface based on the round robin protocol (alternately choosing interface 311, then 312, and so on), though in the fallback case where no interface has the necessary parity block buffered, any selection protocol could be used.

At action 270, table update mod 370 updates the table to account for the latest write action. Here the update involves only updating the time at which the ordered pair (331, 311) was last written, but could also involve adding and/or deleting entries from the table. For instance, had table 302 not contained an entry for stripe 331 and had interface selection mod 365 picked interface 311 using the round robin protocol, table update mod 370 would have added the ordered pair (331, 311) to table 302. If the number of entries in table 302 for interface 311 prior to this addition had indicated that buffers for interface 311 were already full, table 302 would have deleted the oldest entry for interface 311 prior to adding the ordered pair, mirroring the action interface 311 would take to free up buffer space when it receives the latest write request. In this way, the table remains up to date for the next table lookup. Note that alternatively or in addition, other mechanisms can be used for keeping the table updated, including updating the table responsive to explicit feedback from the interfaces themselves about what they are doing with their buffers.

III. Further Comments and/or Embodiments

Some embodiments of the present invention recognize: (i) that whenever a block is written to a RAID 5 array, it is necessary to recalculate and rewrite the parity block for the stripe the block belongs to; (ii) that this process requires that the parity block be transferred into a buffer where the parity calculation can be performed and the block's contents updated; (iii) that subsequent to these actions, the updated data and parity blocks are written to the respective devices in which they reside; (iv) that in some storage subsystems, the buffers for the parity calculation may be private to specific interfaces on the storage subsystem; and/or (v) that in such storage subsystems, if one block is written to a given stripe on one interface, and then another block in the same stripe is written on another interface, a transfer of the parity block from one buffer to another may be required, causing the second write to incur a performance penalty while it waits for the transfer to take place.

Some embodiments of the present invention recognize: (i) that none of the surveyed multipath routing algorithms exploit awareness of the RAID topology; (ii) that because of this, these algorithms may write blocks from the same RAID stripe to different I/O interfaces; and (iii) that this in turn may cause RAID parity blocks to have to be transferred between the buffers associated with those interfaces, resulting in a performance penalty.

As a result, some embodiments of the present invention may include a multipath routing algorithm that: (i) includes awareness of RAID topology; (ii) optimizes the case where a block in a RAID stripe has been recently written, and another block in the same RAID stripe is about to be written; and/or (iii) routes the second write to the same interface as the first, reducing the probability of having to transfer the parity block from another interface or read it from non-volatile storage, both of which would incur a performance penalty.

Figure 4:
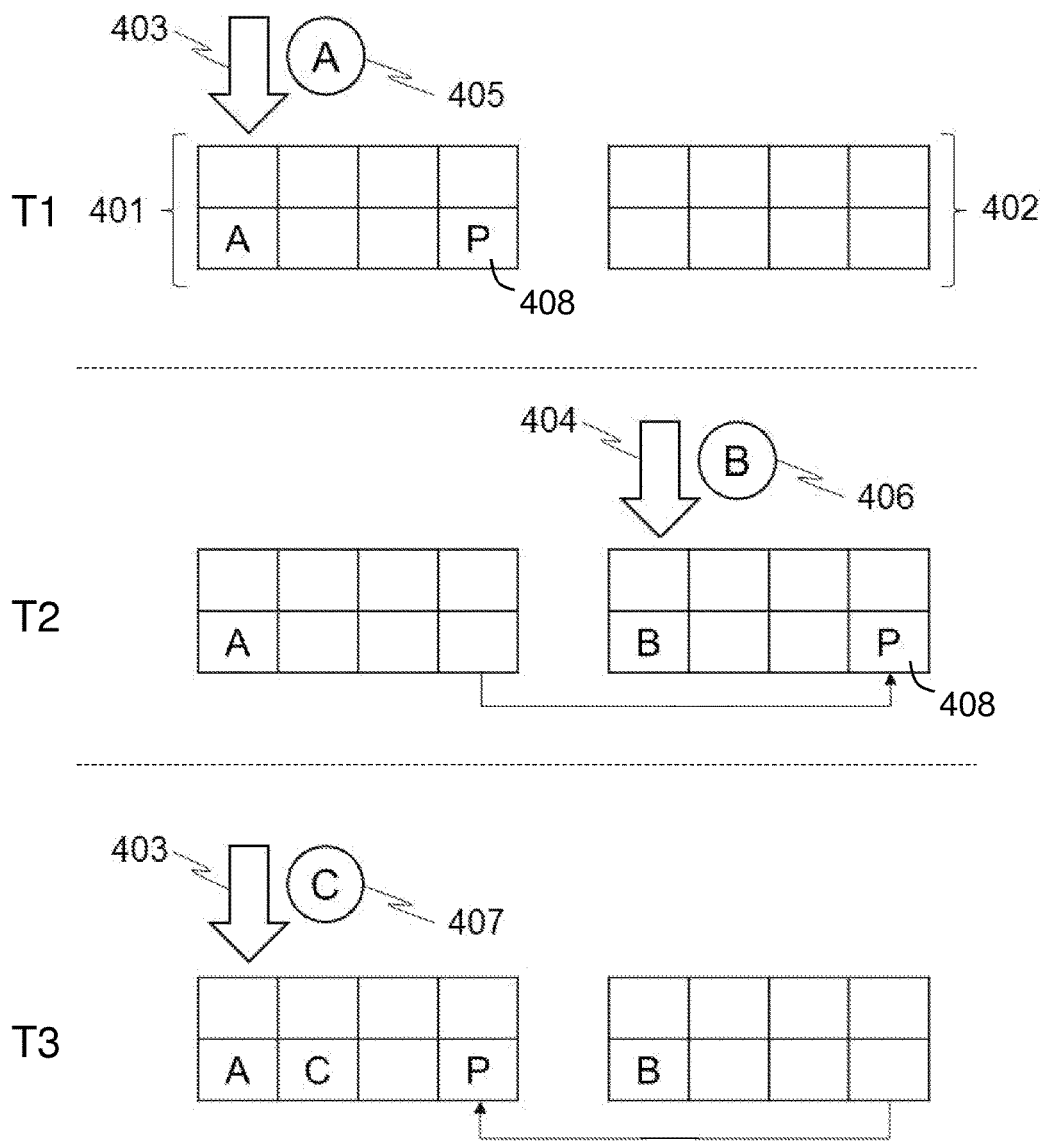
FIG. 4 is a diagram of interface write buffers showing data buffering (with block transfers between buffers of different interfaces) helpful in understanding a second embodiment system according to the present invention.

Shown in FIG. 4 is a multipath RAID system. FIG. 4 depicts input/output (I/O) interface (buffer set) 401 and I/O interface (buffer set) 402 at times T1, T2, and T3. FIG. 4 also includes: paths 403 and 404; data blocks A 405, B 406, and C 407; and parity block P 408. At time T1, a host (not shown) writes data block A 405 to I/O interface 401 via path 403. (The path chosen is according to a known multi-path routing algorithm, such as shortest queue or round robin.) Parity block P 408, which is the parity block for the RAID stripe that block A resides in, is read into a buffer associated with I/O interface 401 and updated. At time T2, the host writes data block B 406, which is in the same RAID stripe as block A, to I/O interface 402 via path 404. Because parity block P is currently in a buffer in I/O interface 401, it must be transferred to I/O interface 402; this transfer causes a delay to the completion of the block B write operation. At time T3, the host writes block C 407, which is also in the same RAID stripe as blocks A and B, to I/O interface 401.

Because parity block P is buffered at I/O interface 402, it must be transferred back to I/O interface 401, which again causes a delay in the write operation.

Figure 5:
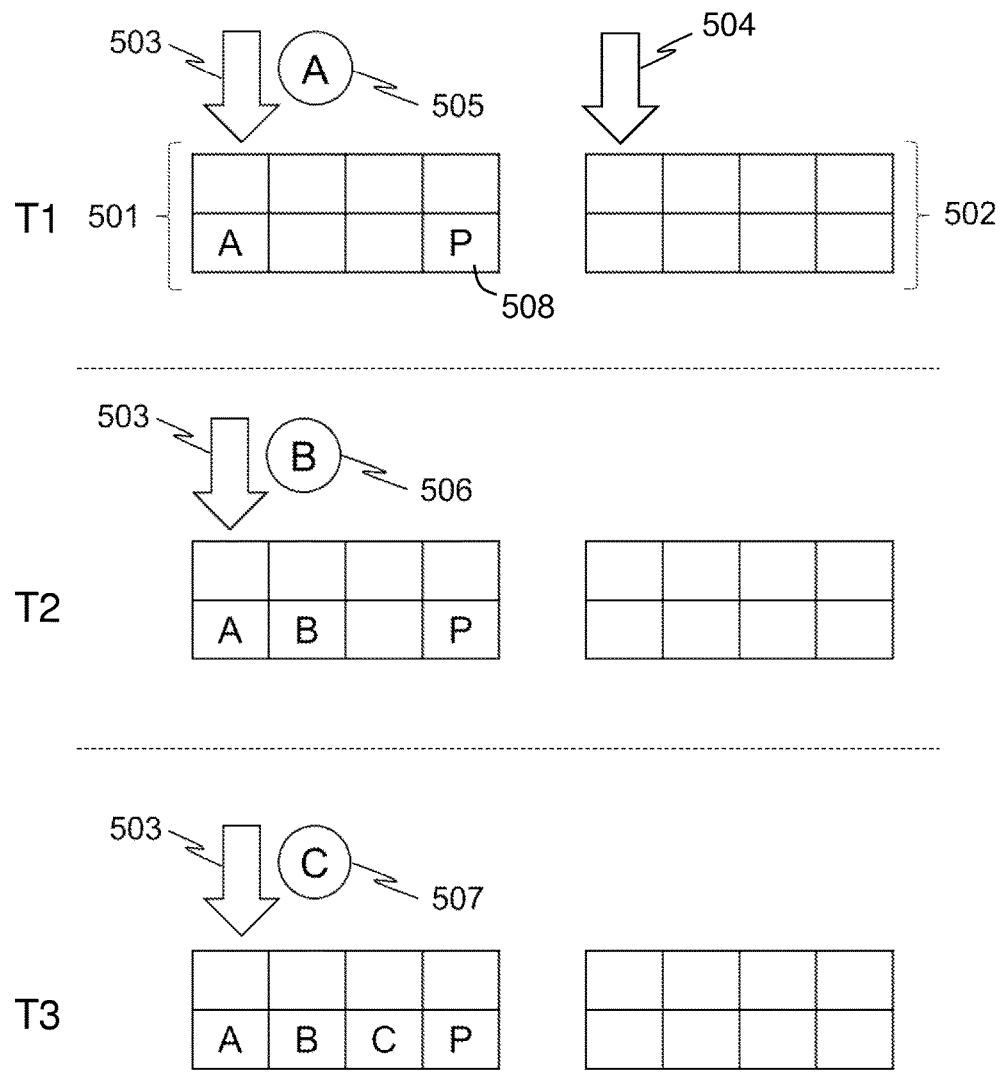
FIG. 5 is a diagram of interface write buffers showing data buffering (without block transfers between buffers of different interfaces) as occurs in the second embodiment system.

Shown in FIG. 5 is a similar sequence of writes, but in a RAID-topology-aware system. FIG. 5 depicts input/output (I/O) interface (buffer set) 501 and I/O interface (buffer set) 502 at times T1, T2, and T3. FIG. 5 also includes: paths 503 and 504; data blocks A 505, B 506, and C 507; and parity block P 508. At time T1, a host (not shown) writes block A 505 to I/O interface 501 via path 503, and parity block P 508 is read into a buffer on I/O interface 501 and updated, similarly to what was described above for FIG. 4. At time T2, however, the host exploits the knowledge that block B 506 resides in the same RAID stripe as block A 505, and, knowing that parity block P is already buffered at I/O interface 501, writes block B 506 to I/O interface 501, updating the parity block accordingly. Note that, unlike in FIG. 4, no transfer of the parity block is required. Finally, at time T3, the host exploits the knowledge that block C 507 resides in the same RAID stripe as blocks A and B, and writes block C 507 to I/O interface 501. Again, parity block P 508 is updated without it having to be transferred from another interface. In total, two transfers of a parity block were avoided in the example of FIG. 5 relative to the example of FIG. 4.

In some embodiments of the present invention, a table is maintained in the host. The table contains one entry for each RAID buffer associated with an interface on the storage subsystem. Each entry contains the LUN (logical unit number), starting logical block address, and length of a stripe that was recently written to that interface. When a write I/O is issued, the host checks to see if the block to be written belongs to a stripe in the table. If it does, it sends the I/O down a path to the interface associated with that table entry. If it does not, it uses a fallback algorithm to choose the path.

In some embodiments of the present invention, entries in the table are managed in the same way as buffers in the storage subsystem. For example, if buffers in the storage subsystem are managed using an LRU (least recently used) replacement algorithm, then entries in the table are also managed using an LRU algorithm so that the parity blocks buffered in the storage subsystem correspond to the entries in the host's table.

In some embodiments of the present invention, a more deterministic scheme is used that entails having the storage subsystem provide information to the host on the stripes for which it has the parity blocks buffered. This information is stored directly in a host table, keeping the entries in the table in sync with the buffered parity blocks.

Some embodiments of the present invention include one or more of the following features, characteristics, or advantages: (i) apply a RAID-topology-aware algorithm to a RAID 5 storage system; (ii) apply a RAID-topology-aware algorithm to any RAID topology where a parity calculation is applied to a set of blocks with a known topology (RAID 6, for example); (iii) use one or more tables or other associative mechanisms to track blocks, the stripe to which they belong, and the interface over which that stripe was most recently written; (iv) maintain the table(s) or other associative mechanism(s) at the host or at some other point in the storage system such that the associative information is accessible when selecting an interface from multiple possible interfaces to a storage device; (v) achieve performance improvements in storage subsystems where RAID parity buffers are private to each interface; and/or (vi) achieve performance improvements in storage subsystems where performance is enhanced by sending a write to the same interface where a write in the same RAID stripe has been recently sent (for example, in a storage subsystem where performance degradation due to contention occurs if two or more writes to the same stripe are sent through more than one interface).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Data stripe: a set of logically sequential data segments, such that consecutive segments are stored on different physical and/or virtual storage devices; may or may not include data integrity information related to the data segments of the stripe.

Block: as used herein, a segment of a data stripe stored on a physical or virtual storage device distinct from the device(s) storing other segments of that stripe; a bit, a byte, or a multi-byte segment are all examples of blocks (depending, for example, on the RAID level being referenced).

What is claimed is:

1. A method for use with a redundant array of independent disks (RAID) data storage system that includes a plurality of storage system interfaces and that stores data organized into a plurality of RAID stripes, the method comprising:
   receiving a set of input data including information indicative of, for each given RAID stripe of the plurality of RAID stripes, an identification of a corresponding storage system interface of the plurality of storage system interfaces that was most recently used to save data to the given RAID stripe;
   receiving a first request for storing a first piece of data to a first RAID stripe of the plurality of RAID stripes;

responsive to receipt of the first request, determining, based on the input data, that a first storage system interface, of the plurality of storage system interfaces, was most recently used to save data to the first RAID stripe; and responsive to the determination that that the first storage system interface was most recently used to save data to the first RAID stripe, routing the first piece of data through the first storage system interface to thereby save the first piece of data on the first RAID stripe of the RAID data storage system.

2. The method of claim 1 further comprising:
buffering, in the first storage system interface, data relating to the first RAID stripe.

3. The method of claim 2 wherein:
the set of input data further includes an indication that data relating to the first RAID stripe has been buffered in the first storage system interface.

4. The method of claim 1 wherein the plurality of RAID stripes include standard levels RAID 0 through RAID 6.

5. The method of claim 2 wherein:
the data relating to the first RAID stripe that is buffered in the first storage system interface includes a parity block of the first data stripe.

6. The method of claim 1 further comprising:
performing a plurality of data save operations through the plurality of storage system interfaces and to the plurality of RAID stripes; and responsive to respective data save operation of the plurality of data save operations, updating the input data set to keep current data regarding which system storage interface was most recently used to store data to each RAID stripe of the plurality of RAID stripes.

7. A computer program product for use with a redundant array of independent disks (RAID) data storage system that includes a plurality of storage system interfaces and that stores data organized into a plurality of RAID stripes, the computer program product comprising:
a machine readable storage device; and
computer code stored on the machine readable storage device, with the computer code including instructions for causing a processor(s) set to perform operations including the following:
receiving a set of input data including information indicative of, for each given RAID stripe of the plurality of RAID stripes, an identification of a corresponding storage system interface of the plurality of storage system interfaces that was most recently used to save data to the given RAID stripe;
receiving a first request for storing a first piece of data to a first RAID stripe of the plurality of RAID stripes;
responsive to receipt of the first request, determining, based on the input data, that a first storage system interface, of the plurality of storage system interfaces, was most recently used to save data to the first RAID stripe; and
responsive to the determination that that the first storage system interface was most recently used to save data to the first RAID stripe, routing the first piece of data through the first storage system interface to thereby save the first piece of data on the first RAID stripe of the RAID data storage system.

8. The product of claim 7 further comprising:
buffering, in the first storage system interface, data relating to the first RAID stripe.

9. The product of claim 8 wherein:
the set of input data further includes an indication that data relating to the first RAID stripe has been buffered in the first storage system interface.

10. The product of claim 7 wherein the plurality of RAID stripes include standard levels RAID 0 through RAID 6.

11. The product of claim 8 wherein:
the data relating to the first RAID stripe that is buffered in the first storage system interface includes a parity block of the first data stripe.

12. The product of claim 7 further comprising:
performing a plurality of data save operations through the plurality of storage system interfaces and to the plurality of RAID stripes; and responsive to respective data save operation of the plurality of data save operations, updating the input data set to keep current data regarding which system storage interface was most recently used to store data to each RAID stripe of the plurality of RAID stripes.

13. A computer system for use with a redundant array of independent disks (RAID) data storage system that includes a plurality of storage system interfaces and that stores data organized into a plurality of RAID stripes, the computer system comprising:
a processor(s) set;
a machine readable storage device; and
computer code stored on the machine readable storage device, with the computer code including instructions for causing a processor(s) set to perform operations including the following:
receiving a set of input data including information indicative of, for each given RAID stripe of the plurality of RAID stripes, an identification of a corresponding storage system interface of the plurality of storage system interfaces that was most recently used to save data to the given RAID stripe;
receiving a first request for storing a first piece of data to a first RAID stripe of the plurality of RAID stripes;
responsive to receipt of the first request, determining, based on the input data, that a first storage system interface, of the plurality of storage system interfaces, was most recently used to save data to the first RAID stripe; and
responsive to the determination that that the first storage system interface was most recently used to save data to the first RAID stripe, routing the first piece of data through the first storage system interface to thereby save the first piece of data on the first RAID stripe of the RAID data storage system.

14. The system of claim 13 further comprising:
buffering, in the first storage system interface, data relating to the first RAID stripe.

15. The system of claim 14 wherein:
the set of input data further includes an indication that data relating to the first RAID stripe has been buffered in the first storage system interface.

16. The system of claim 13 wherein the plurality of RAID stripes include standard levels RAID 0 through RAID 6.

17. The system of claim 14 wherein:
the data relating to the first RAID stripe that is buffered in the first storage system interface includes a parity block of the first data stripe.

18. The system of claim 13 further comprising:
performing a plurality of data save operations through the plurality of storage system interfaces and to the plurality of RAID stripes; and responsive to respective data save operation of the plurality of data save operations, updating the input data set to keep current data regarding which system storage interface was most recently used to store data to each RAID stripe of the plurality of RAID stripes.

* * * * *